(12) United States Patent
Williams et al.

(10) Patent No.: US 8,126,863 B2
(45) Date of Patent: Feb. 28, 2012

(54) SEARCH CONTROL COMBINING CLASSIFICATION AND TEXT-BASED SEARCHING TECHNIQUES

(75) Inventors: Mark Joseph Williams, San Francisco, CA (US); John Anderson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 12/191,275

(22) Filed: Aug. 13, 2008

(65) Prior Publication Data

US 2009/0112819 A1   Apr. 30, 2009

Related U.S. Application Data

(60) Provisional application No. 60/982,689, filed on Oct. 25, 2007.

(51) Int. Cl.
*G06F 7/00* (2006.01)
*G06F 17/30* (2006.01)

(52) U.S. Cl. .................................. 707/705; 707/999.003

(58) Field of Classification Search ....................... None
See application file for complete search history.

(56) References Cited

U.S. PATENT DOCUMENTS

6,963,867 B2 * 11/2005 Ford et al. ..................... 707/752
(Continued)

*Primary Examiner* — Wilson Lee
*Assistant Examiner* — Jessica N Le
(74) *Attorney, Agent, or Firm* — Blakely, Sokoloff, Taylor & Zafman LLP (57) ABSTRACT

A search control in a user interface enables a user to search documents on text or a tag.

12 Claims, 5 Drawing Sheets

U.S. PATENT DOCUMENTS

| | | |
|---|---|---|
| 7,340,451 B2 | 3/2008 | Sacco |
| 2002/0027567 A1* | 3/2002 | Niamir .......................... 345/738 |
| 2006/0195435 A1* | 8/2006 | Laird-McConnell et al. .... 707/4 |
| 2006/0248078 A1* | 11/2006 | Gross et al. ...................... 707/5 |
| 2007/0038615 A1* | 2/2007 | Vadon et al. ..................... 707/4 |
| 2007/0043583 A1* | 2/2007 | Davulcu et al. .................. 705/1 |
| 2007/0061328 A1* | 3/2007 | Ramer et al. .................... 707/10 |
| 2007/0118802 A1* | 5/2007 | Gerace et al. ................... 715/738 |
| 2007/0162422 A1* | 7/2007 | Djabarov ......................... 707/2 |
| 2007/0162926 A1* | 7/2007 | Steelberg et al. ................ 725/34 |
| 2008/0126983 A1* | 5/2008 | Keohane et al. ................ 715/810 |
| 2008/0126990 A1* | 5/2008 | Kumar et al. ................... 715/835 |
| 2008/0228749 A1* | 9/2008 | Brown ............................ 707/5 |
| 2008/0235216 A1* | 9/2008 | Ruttenberg ..................... 707/5 |
| 2009/0007113 A1* | 1/2009 | Prager et al. ................... 718/100 |
| 2009/0077089 A1* | 3/2009 | Safo et al. ....................... 707/10 |
| 2009/0089690 A1* | 4/2009 | Chi et al. ........................ 715/764 |
| 2009/0144234 A1* | 6/2009 | Sharif et al. .................... 707/3 |

* cited by examiner

FIG. 6

SEARCH CONTROL COMBINING CLASSIFICATION AND TEXT-BASED SEARCHING TECHNIQUES

RELATED APPLICATION

This patent application claims priority from U.S. Provisional Patent Application No. 60/982,689, for "Search Control Combining Classification and Text-Based Searching Techniques," filed Oct. 25, 2007, which provisional patent application is incorporated by reference herein in its entirety.

TECHNICAL FIELD

The subject matter of this patent application is generally related to user interfaces and search controls for same.

BACKGROUND

Conventional search programs are overly complicated and require entry of complex search strings and/or require the presentation of a complicated search menu to configure parameters to perform a search.

SUMMARY

A drop-down control enables a user to search documents (e.g., web pages) on a tag or text. In some implementations, the control can be delivered to a client device (e.g., a personal computer, mobile phone, smart phone, personal digital assistant, email device) over a network (e.g., the Internet). For example, the control can be included in a browser-delivered web application.

In some implementations, the control can appear as a search icon (e.g., a magnifying glass) in a user interface (e.g., a browser window, desktop tool bar). In some implementations, clicking on the icon displays a drop-down menu that contains a list of recent tags (e.g., keywords or phrases associated with a particular document). The same tag can be applied to multiple documents and a single document can be associated with multiple tags. The menu can include a link to one or more tags in a document and a link to one or more pages that have been recently viewed by the user. The drop-down menu can also include a text entry field, which can be used to search pages by text contained in the document. In some implementations, when the user types into the text field, the list of recent tags disappears and is replaced by a list of page titles. Clicking a page title displays that page.

In some implementations, selecting (e.g., clicking) a tag displays a page of search results containing links to pages that have been tagged with the selected tag. The list of recent tags can be based on nested heuristics constrained by a finite list length. For example, a primary heuristic can be a group of tags that a user has created and a secondary heuristic can be tags associated with pages that the user has recently viewed. In some implementations, if the primary heuristic fills the list, then the secondary heuristic is not used.

The disclosed invention advantageously allows users to browse pre-defined classification systems and perform text-based searching using a single search control. The search control can be included in a browser-delivered web application as well as many other contexts or applications where users desire to search for information (e.g., remote or local search engines, emails systems, Instant Messaging systems, e-book readers).

DETAILED DESCRIPTION

Figure 1:
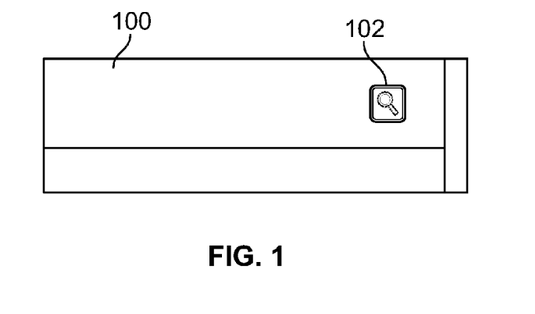
FIG. 1 illustrates a search icon located in a browser content area.

FIG. 1 illustrates a search icon located in a browser content area. In the example shown, when a user wants to perform a search they click or otherwise interact with a search icon 102 (e.g., a magnifying glass), which in this example is located in the upper right hand corner of a browser content area 100. The search icon 102 can have any desired appearance and can be located on any desired user interface, including user interfaces associated with applications having primary functions other than searching.

Figure 2:
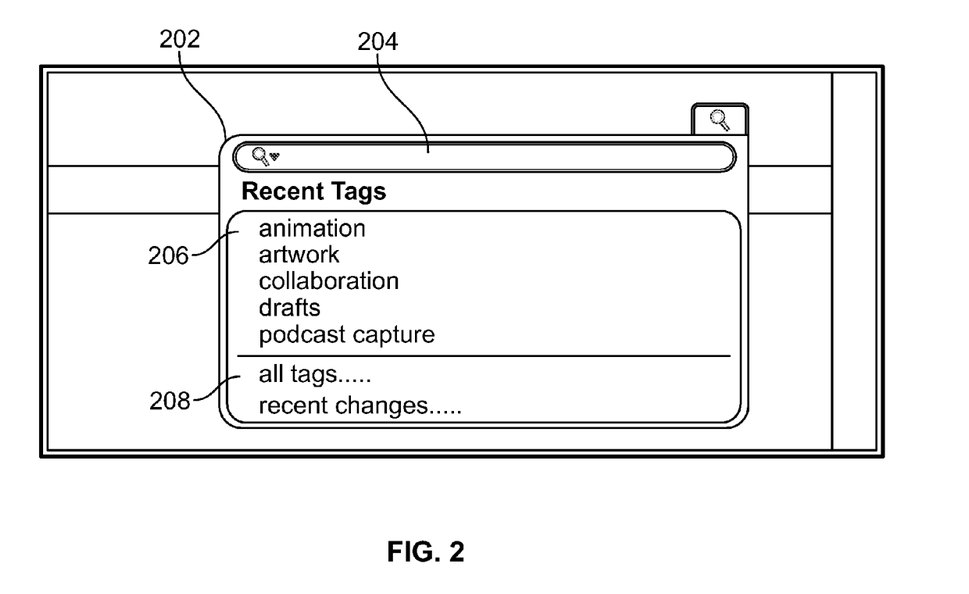
FIG. 2 illustrates a drop-down menu including a list of tags.

FIG. 2 illustrates a drop-down menu including a list of tags. In the example shown, a dropdown menu 202 appears when the user clicks or otherwise interacts with the search icon 102. In some implementations, the menu 202 includes a text search box 204 and contains a list of tags 206 (e.g., recent tags). As used herein, a "tag" is a keyword or phrase that has been associated with individual documents that allow for each organization and retrieval of those documents. As used herein, a "document" can be a web page (e.g., a wiki page), email, text document, audio file, digital image, video, application, instant message or any other data or application that may reside on one of several (e.g., a network) of data processing or storage systems.

In the example shown, the menu 202 includes the list of recent tags 206: animation, artwork, collaboration, drafts and podcast capture. The same tag can be applied to many different documents, and individual documents can be associated with many tags. In some implementations, it can be important to present users with smaller sets of tags that are likely to be meaningful to them. For example, a wiki site can have many pages and many users tagging pages with many tags per page. The set of "recent tags" in the menu 202 presents the user with smaller sets of meaningful tags by using nested heuristics constrained by a finite list length to keep the list consistently brief and easy to scan. Other techniques (e.g., temporal or subject matter filters) can also be used to reduce the number of tags presented to the user in the menu 202.

In some implementations, a primary heuristic can be a group of tags that the user has created. A secondary heuristic can be a group of tags associated with documents that the user has recently viewed. If the primary heuristic fills the list, then the secondary heuristic may not be used. For convenience, the menu 202 can also include additional links 208 (e.g., persistent links) to the tags (e.g., all the tags in a given document), and to documents that have been recently viewed.

Figure 3:
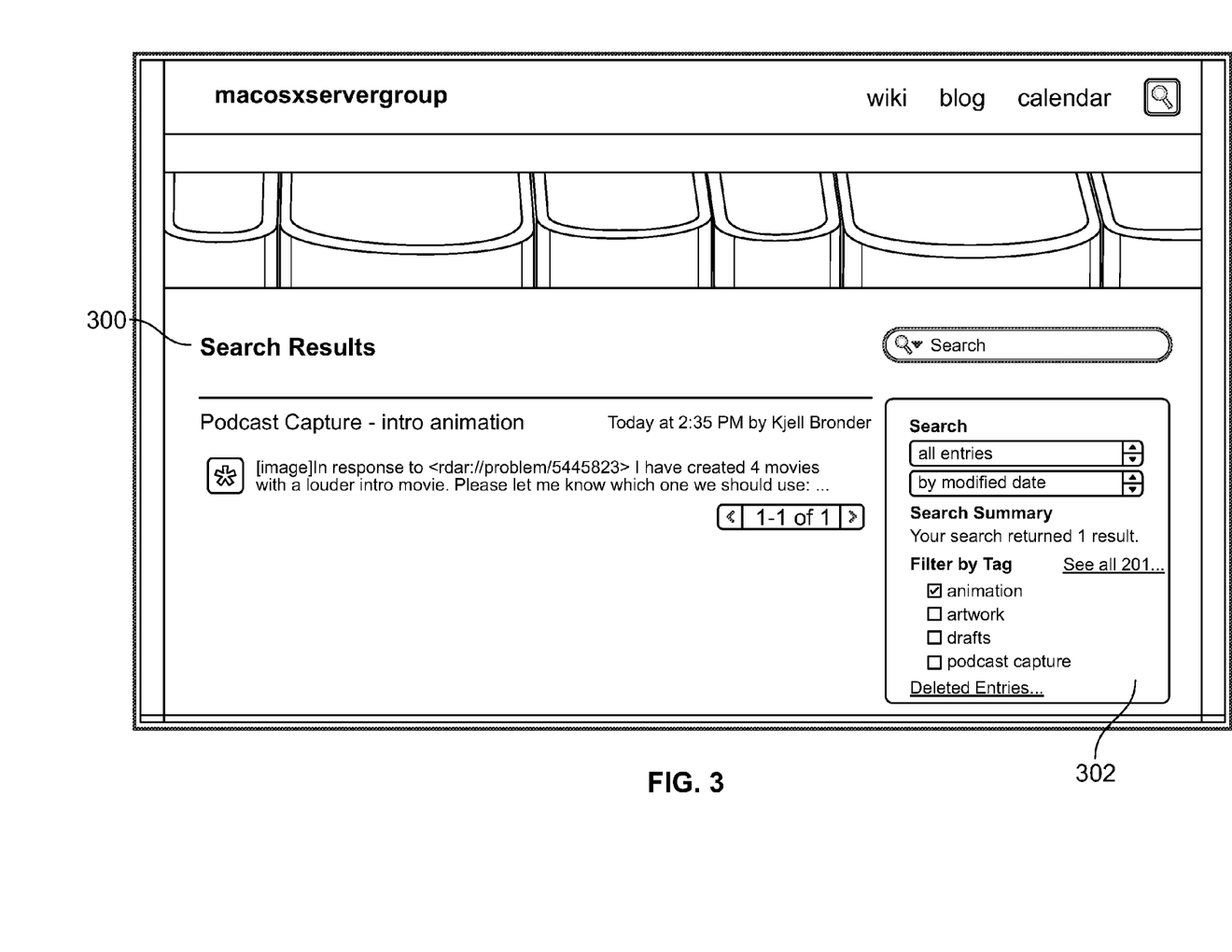
FIG. 3 illustrates a page of search results generated as a result of selecting a tag.

FIG. 3 illustrates a page of search results generated as a result of selecting a tag from the list of tags 206 in menu 202. In the example shown, if the user selects (e.g., clicks) or otherwise interacts with a tag (e.g., the animation tag) in the list of tags 206, then they are presented with a search results page 300 containing links to documents (e.g., wiki pages) that have been tagged with the "animation" tag. From the search results page 300, the user can select a result (e.g., in this example a link to "Podcast Capture—intro animation"), or the user can refine their search using either text or tags. In some implementations, the search results page 300 can include search tools 302, including but not limited to search filters which can filter by text or tags. In the example shown, the user can search selected entries with a search modifier (e.g., by modified date) or check a box to filter by a tag.

Figure 4:
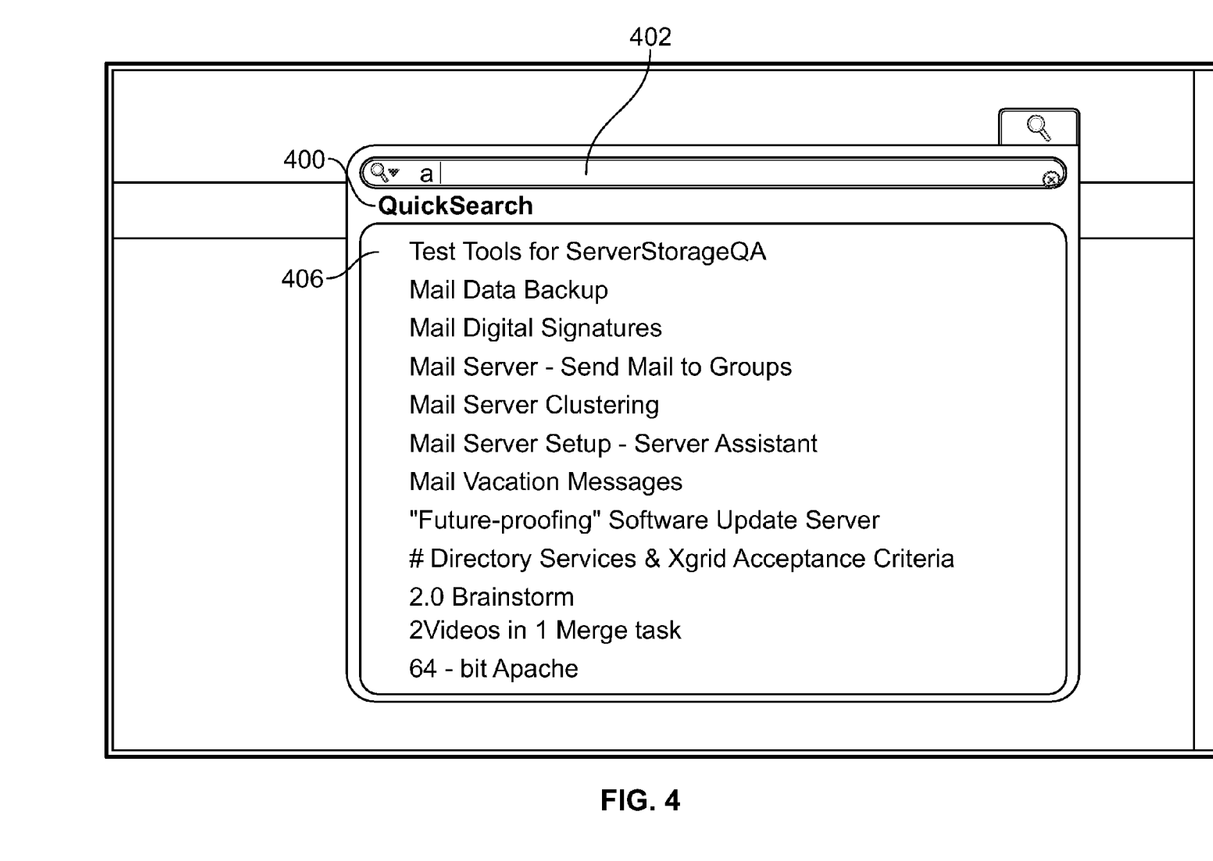
FIG. 4 illustrates a drop-down menu including a list of pages responsive to the user entering text in a text field.

FIG. 4 illustrates a drop-down menu including a list of pages responsive to the user entering text in a text field. In the example shown, when the user clicks on the search control 102, a dropdown menu 400 changes from a list of recent tags to a list of document titles 406 (e.g., wiki page titles). In this example, the user started to enter text into the search box 402 resulting in the menu 400 presenting document titles 406. Clicking on a document title (e.g., "Test Tools for ServerStorageQA") results in the user being directed to that document.

Figure 5:
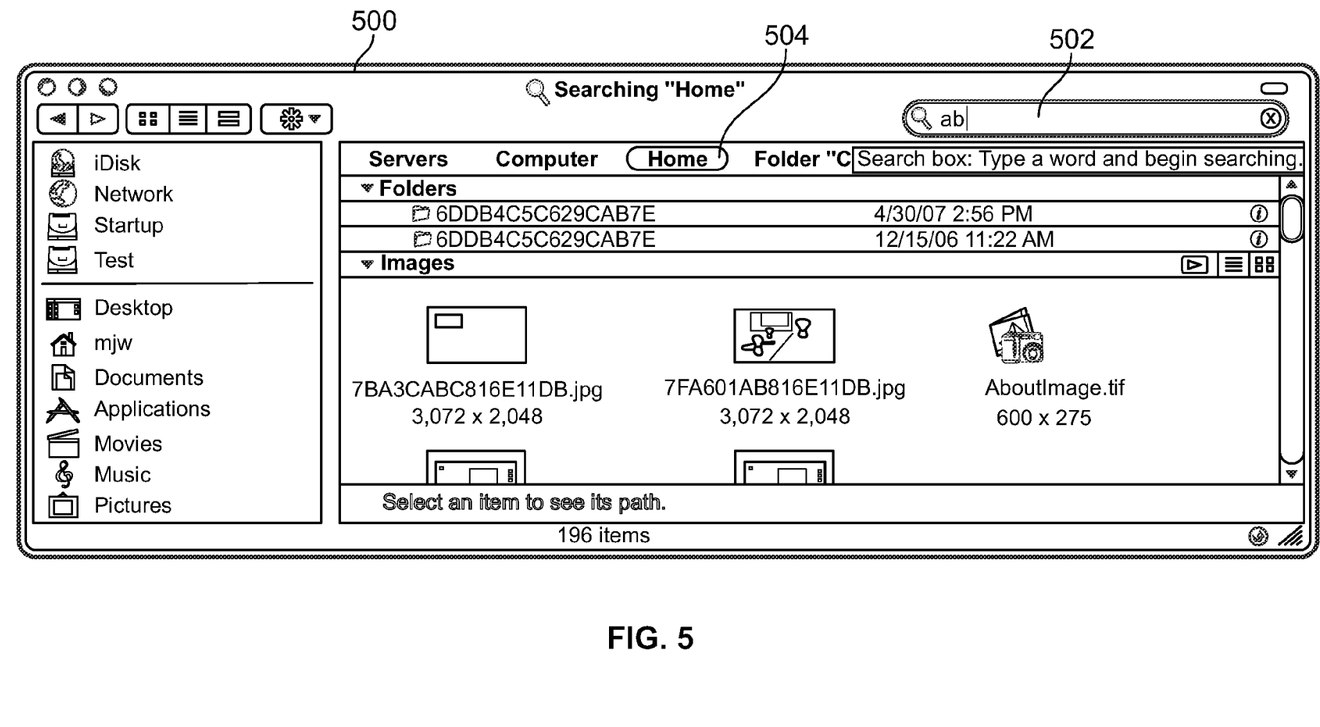
FIG. 5 illustrates a user interface including features described in reference to FIGS. 1-4.

FIG. 5 illustrates a user interface 500, including features described in reference to FIGS. 1-4. In the example shown, the user interface 500 (e.g., a browser window) includes a search control 502, which operates as previously described in reference to FIGS. 1-4.

The disclosed invention provides at least the following advantages over conventional search systems:

- The invention can be part of a web application. Conventional search systems are often desktop systems.
- The invention uses practical heuristics to winnow a list of tags initially presented to the user. In contrast, conventional search systems display an entire set of predefined folders and documents in a selected directory.
- The invention can present one or more tags that are of immediate interest to the user. In conventional search systems, it is likely that the user will have to burrow through several layers of hierarchical containers to arrive at a desired target.
- The invention can be a single control with a single level of hierarchy. Conventional search systems are often multi-pane hierarchical browsers.
- The tag browsing mode of the invention browses tags. Browsing modes of conventional search systems often include all directories, folders, and documents which is a much larger heterogeneous set of items to search.

System Architecture

Figure 6:
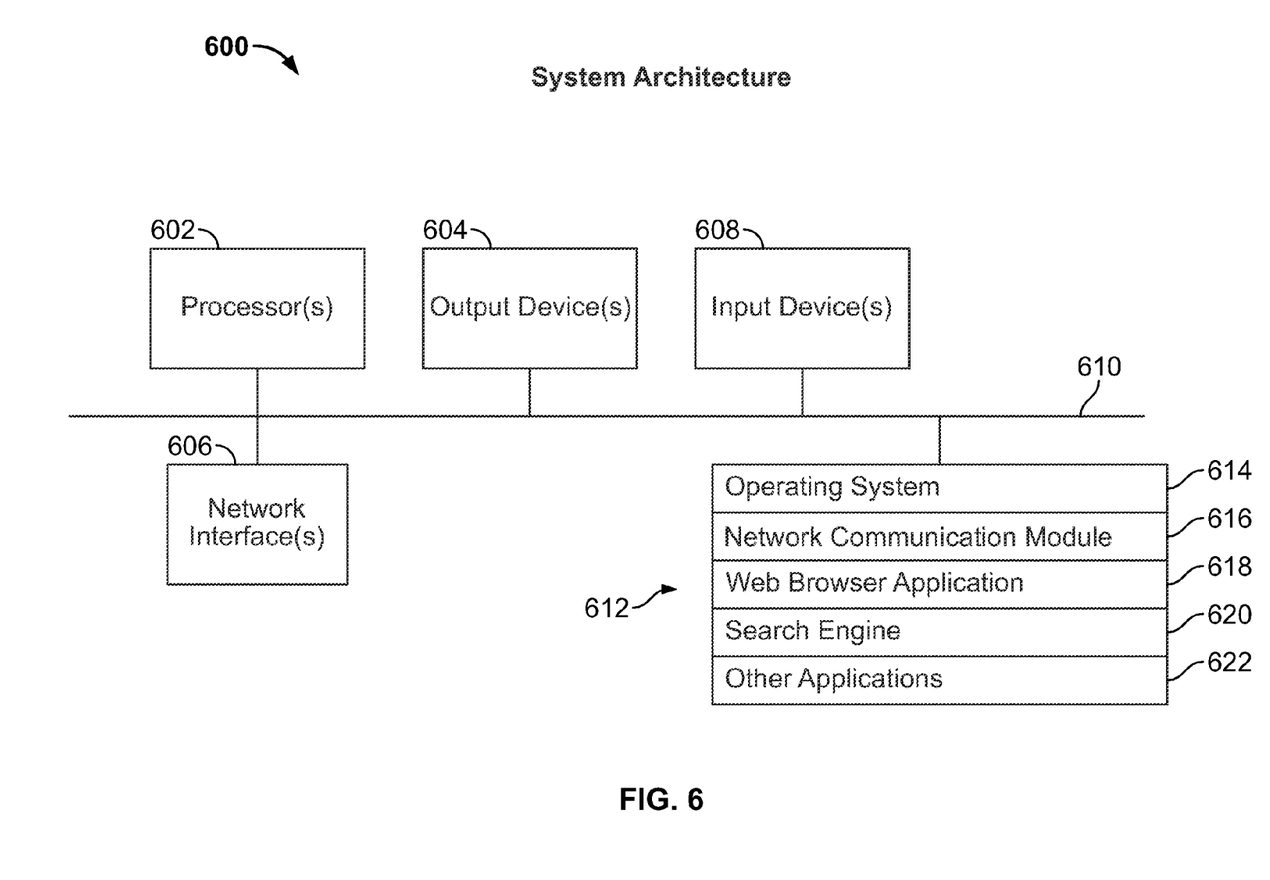
FIG. 6 is a block diagram of a system architecture for implementing the features and operations described in reference to FIGS. 1-5.

FIG. 6 is a block diagram of a system architecture for implementing the features and operations described in reference to FIGS. 1-5. Other architectures are possible, including architectures with more or fewer components. In some implementations, the architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 612 further includes an operating system 614 (e.g., Mac OS® server, Windows® NT server), a network communication module 616, a web browser application 618 (e.g., Microsoft Internet Explorer®, Apple Safari®), an audio engine 620 and one or more other applications 622. The operating system 614 can be multi-user, multiprocessing, multitasking, multithreading, real time, etc. The operating system 614 performs basic tasks, including but not limited to: recognizing input from and providing output to the devices 606, 608; keeping track and managing files and directories on computer-readable mediums 612 (e.g., memory or a storage device); controlling peripheral devices; and managing traffic on the one or more communication channels 610. The network communications module 616 includes various components for establishing and maintaining network connections (e.g., software for implementing communication protocols, such as TCP/IP, HTTP, etc.).

The web browser application 618 or other application 622 presents a user interface (e.g., a browser window) including a search control, as described in reference to FIGS. 1-5. The search engine 620 interacts with the search control, and can include various software components and processes for receiving and processing search requests initiated by a user through the search control.

The architecture 600 is one example of a suitable architecture for hosting a browser application having a search controls. Other architectures are possible, which include more or fewer components. The architecture 600 can be included in any device capable of hosting a web browser, including but not limited to: media players, mobile phones, smart phones, email devices, game consoles or devices, personal computers, personal digital assistants, etc. The architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, the method comprising:
   identifying, by a processor, a set of tags to have meaning to a user based on detected user activity within a user interface, the user activity including the user accessing files associated with the set of tags and/or the user creating new tags;
   displaying a user interface within a browser content area, wherein the user interface comprising a text search field and drop-down menu adjacent to the text search field and having a plurality of selectable entries;
   initially populating the plurality of selectable entries within the drop-down menu with the set of tags which are to have meaning to the user;
   in response to the user entering text in the text search field, removing the set of tags and populating the plurality of selectable entries within the same drop-down menu with a listing of files associated with the text which is entered by the user;
   receiving a first input indicating that the user has either selected one of the set of tags or one of the listing of files from the drop-down menu;
   performing a search based on the first input, wherein when the first input indicates that the user has selected one or more of the set of tags, then performing a search comprises searching for files associated with the selected tags and wherein when the first input indicates that the user has selected one or more of the listing of files, then performing a search comprises searching for the selected one or more files;
   wherein the populating the plurality of selectable entries within the same drop-down menu with the listing of files associated with the text entered by the user comprises identifying files having titles corresponding to the entered text and populating the plurality of selectable entries with the titles of the files;
   wherein the set of tags include animation, artwork, collaboration, drafts, and podcast capture; and
   presenting results of the search on the user interface;
      wherein the presenting results of the search on the user interface further comprises concurrently presenting a set of search tools including search filters to filter the search results by additional text and/or additional tags;
      wherein the additional tags are selectable by selecting one or more check boxes associated with the additional tags; and
      wherein the search tools include a search modifier to specify a date.

2. The method of claim 1, further comprising:
   providing a link in the user interface for each of the results, the link pointing to a file identified by the search.

3. The method of claim 2 wherein the file comprises a web page, email message, text document, audio file, digital image, application, or instant message.

4. The method of claim 1 wherein the first input indicates that the user has selected one of the titles from the drop-down menu; and
   responsively displaying at least a portion of a document associated with the selected title.

5. The method of claim 1, further comprising:
   responsive to selection of a tag, displaying search results including a link to a document that is tagged with the selected tag.

6. The method as in claim 1 wherein the set of tags are selected by using nested heuristics constrained by a finite list length to keep the set of tags brief and easy to scan.

7. A non-transitory computer-readable medium having instructions stored thereon, which, when executed by a processor, causes the processor to perform operations comprising:
   identifying a set of tags to have meaning to a user based on detected user activity within a user interface, the user activity including the user accessing files associated with the set of tags and/or the user creating new tags;
   displaying a user interface within a browser content area, the user interface comprising a text search field and drop-down menu adjacent to the text search field and having a plurality of selectable entries;
   initially populating the plurality of selectable entries within the drop-down menu with the set of tags which are to have meaning to the user;
   in response to the user entering text in the text search field, removing the set of tags and populating the plurality of selectable entries within the same drop-down menu with a listing of files associated with the text entered by the user;
   receiving a first input indicating that the user has either selected one of the set of tags or one of the listing of files from the drop-down menu;
   performing a search based on the first input, wherein when the first input indicates that the user has selected one or more of the set of tags, then performing a search comprises searching for files associated with the selected tags and wherein when the first input indicates that the user has selected one or more of the listing of files, then performing a search comprises searching for the selected one or more files;

wherein the populating the plurality of selectable entries within the same drop-down menu with a listing of files associated with the text entered by the user comprises identifying files having titles corresponding to the entered text and populating the plurality of selectable entries with the titles of the files;

wherein the set of tags include animation, artwork, collaboration, drafts, and podcast capture; and presenting results of the search on the user interface;
    wherein the presenting results of the search on the user interface further comprises concurrently presenting a set of search tools including search filters to filter the search results by additional text and/or additional tags;
    wherein the additional tags are selectable by selecting one or more check boxes associated with the additional tags; and
    wherein the search tools include a search modifier to specify a date.

8. The non-transitory computer-readable medium of claim 7, further comprising:
    providing a link in the user interface for each of the results, the link pointing to a file identified by the search.

9. The non-transitory computer-readable medium of claim 8, wherein the file comprises a web page, email message, text document, audio file, digital image, application, or instant message.

10. The non-transitory computer-readable medium of claim 7 wherein the first input indicates that the user has selected one of the titles from the drop-down menu; and
    responsively displaying at least a portion of a document associated with the selected title.

11. The non-transitory computer-readable medium of claim 9, further comprising:
    responsive to selection of a tag, displaying search results including a link to a document that is tagged with the selected tag.

12. The non-transitory machine-readable medium as in claim 7 wherein the set of tags are selected by using nested heuristics constrained by a finite list length to keep the set of tags brief and easy to scan.

\* \* \* \* \*